(12) United States Patent
Vigliotti et al.

(10) Patent No.: US 12,547,449 B2
(45) Date of Patent: Feb. 10, 2026

(54) DYNAMIC POST-DEPLOYMENT SERVER CONFIGURATION

(71) Applicant: Salesforce, Inc., San Francisco, CA (US)

(72) Inventors: Raffaele Vigliotti, Milan (IT); Sze K. Li, Bellevue, WA (US); Oleksandr Senyuk, Bellevue, WA (US); Michael Byrne, Indianapolis, IN (US); Omar Jaber, Bellevue, WA (US); Bradley Kenneth Michel, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 468 days.

(21) Appl. No.: 18/094,655

(22) Filed: Jan. 9, 2023

(65) Prior Publication Data

US 2024/0231897 A1    Jul. 11, 2024

(51) Int. Cl.
*G06F 9/48* (2006.01)
*G06F 9/445* (2018.01)

(52) U.S. Cl.
CPC ........ *G06F 9/4881* (2013.01); *G06F 9/44505* (2013.01)

(58) Field of Classification Search
CPC . G06F 9/4881; G06F 9/44505; G06F 9/45512
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

*Primary Examiner* — Vincent H Tran
(74) *Attorney, Agent, or Firm* — Butzel Long (57) ABSTRACT

Server instantiation or deployment with at least an orchestrated post-deployment configuration service utilizing an exemplary framework providing script orchestration, logging, retry logic and environment-specific infrastructure and service configurations. At least one repository may store configuration scripts (or their equivalent), including first scripts associated with, e.g., a multi-tenant system, vendor, database provider, controller, etc., and second scripts associated with, e.g., a tenant, a database client, customer, etc. After instantiating or installing a server, it may be configured with orchestrated execution to ensure successful first server configuration, and then further configured with orchestrated execution of second scripts to ensure successful subsequent server configuration. Orchestration includes retry logic, logging, and reboot support to repeat or continue script execution after reboot, and the number of scripts series is arbitrary, e.g., there may first, second, third, etc. to orchestrate configuring or deploying a server as desired.

20 Claims, 4 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,250,455 B1* | 4/2019 | Moniz .................. H04L 41/5045 |
| 10,264,058 B1* | 4/2019 | Lauinger ............. H04L 12/4625 |
| 10,318,265 B1* | 6/2019 | To .......................... H04L 67/34 |
| 10,324,701 B1* | 6/2019 | Stickle ...................... G06F 8/63 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0337502 A1* | 11/2014 | Cahill ............... H04L 67/02 709/223 |
| 2014/0359537 A1 | 12/2014 | Jackobson et al. |
| 2016/0103667 A1* | 4/2016 | Chen .................. G06F 8/60 717/121 |
| 2016/0203074 A1* | 7/2016 | Van Grinsven ........ G06F 8/61 714/38.1 |
| 2018/0285156 A1* | 10/2018 | Corey ............... G06F 9/5005 |
| 2023/0088202 A1* | 3/2023 | Myers ............... G06F 8/63 717/176 |
| 2023/0342341 A1* | 10/2023 | Mohammed ......... G06F 9/4881 |
| 2024/0143342 A1* | 5/2024 | Parthasarathy ..... H04L 41/0813 |

\* cited by examiner

DYNAMIC POST-DEPLOYMENT SERVER CONFIGURATION

TECHNICAL FIELD

Post deployment server configuration, and more particularly to orchestrated execution of configuration scripts for cloud-based servers deployed in immutable infrastructure operable across server reboots during configuration.

BACKGROUND ART

After deployment into an environment, a server is typically configured, such as according to its intended purpose, in accord with client configuration requirements, etc. Often configuration is not a simply one-stop event, instead configuration is an incremental application of one or more feature and/or configuration change. Typically, between incremental changes, the server may be rebooted one or more times.

Ability to configure servers to a desired state may be affected by the nature of the environment in which a server is placed. This desired state, in mutable infrastructure environments (see, e.g., Internet URL https://eplexity.com/a-side-by-side-comparison-of-immutable-vs-mutable-infrastructure/), typically deployed on premises, has been historically defined and maintained by Configuration Management solutions like SCCM or Chef. This software is deployed in each environment (e.g. dev, test, stage) and typically managed by a single team (System Administrators) who is responsible for applying all the required configurations and vulnerability fixes to the entire fleet of servers and ensuring the Configuration Management Software corrects any eventual drifts.

This single team approach does not work for immutable infrastructure environments, typically deployed on public or private clouds, where Continuous Improvement and Continuous Delivery are required for increased velocity, testing and release of the different applications in different environments which are packaged as a service alongside the necessary infrastructure configurations and customizations.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

In a service oriented architecture, Software Developers are typically assumed to own. and have hands-on access to, the server and infrastructure configuration required to power and configure their application in the release and deployment process. However, when servers are deployed into immutable environments, such as to a cloud-based and/or virtual platform or environment, it becomes more difficult for teams to still provided a repeatable, consistent and automated method for configuring their server to a desired post-deploy state as may be achieved with a typical hands-on deployment. The following describes exemplary implementations for an orchestrated post-deployment configuration service utilizing an exemplary framework providing script orchestration, logging, retry logic and environment-specific infrastructure and service configurations. Post-deployment server configuration may be performed as described below after a server is set in an environment. Typically configuration tools are used, e.g., Microsoft's Systems Management Server (SMS) or Systems Center Configuration Manager (SCCM), Chef (see, e.g., Internet Uniform Resource Locator (URL) www.chef.io), or other configuration tools. Such tools do not work in immutable infrastructure environments, typically deployed on public or private clouds.

Figure 1:
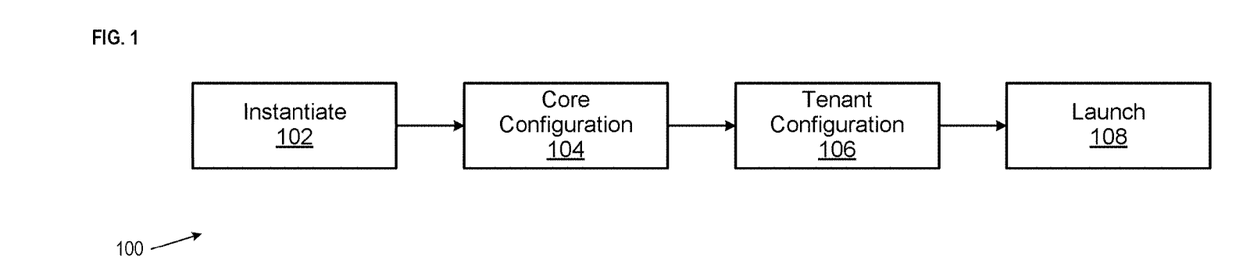
FIG. 1 is a flow diagram according to some example implementations.

FIG. 1 illustrates a flow diagram 100 according to some example implementations for instantiating and configuring a server. It will be appreciated that the term server as used herein may represent a conventional computing device or machine, e.g., a device including volatile and/or nonvolatile memory and/or storage, an operating system, applications and/or programs and/or functionality disposed within the memory and/or storage which may be executed by one or more fixed and/or programmable processors and/or computing hardware/software providing processor functionality. The term server may also include cloud-based servers, such as provided on public, private and/or hybrid cloud environments, infrastructure-as-a-service environments, etc. A public cloud provides server services where the server and related hardware and services are managed by a third-party and may be shared by or provided exclusively to tenants or clients of the third-party. Well-known public cloud examples include Amazon Web Services (AWS), Microsoft Azure, Google Cloud, IBM Cloud, Oracle Cloud, etc.

For exemplary purposes we will assume AWS is the cloud-based server environment used in the exemplary illustrated implementations, however it will be appreciated the teachings herein may be abstracted to other public and/or private cloud-based servers. Also, the expression cloud-based server is also used for convenience, but it will be appreciated that while future technology may employ different naming, such as to refer to a server by some other name, the principles discussed herein are intended to be applicable to any environment in which actual and/or virtual hardware and/or software are made available over, for example, a network, to clients/connecting devices/hardware/software/etc. in ways currently perceived as used in cloud-based server environments. It is assumed the reader is familiar with instantiating a server (or equivalent functionality) on the cloud-based environment, e.g., AWS. As will be appreciated by one skilled in the art, various techniques may be used to initially configure a server being deployed. For example, a well-known configuration tool is "Cloudbase-Init" (CBI), see, e.g., Internet Uniform Resource Locator (URL) cloudbase.it/cloudbase-init, which when deployed as a service on, for example, Windows, may be used to manage guest initialization actions, e.g., disk management, user creation, password management, custom PowerShell, and script execution, see, e.g., URL cloudbase-init.readthedocs.io/en/latest/tutorial.html, which states:

ability to execute user provided scripts, usually found in the default path C:\Program Files (x86)\Cloudbase Solutions\Cloudbase-Init\LocalScripts, through a specific plugin for doing it. Depending on the platform used, the files should be valid PowerShell, Python, Batch or Bash scripts. The userdata can be also a PEM certificate, in a cloud-config format or a MIME content. The user data plugin is capable of executing various script types and exit code value handling.

As will be appreciated by one skilled in the art, CBI accesses a specified folder, identifies scripts, PowerShell files, etc. in the folder and executes them. Unfortunately, there is no orchestration to the execution. That is, they may be accessed and executed randomly and/or in parallel or contemporaneously. Since lack of control over if and when a script or other tool is accessed, exemplary implementations discussed implement "script orchestration" which adds sequencing to running scripts to configure/set up a deployed/instantiated server. Logging and try/retry logic allow for step-wise configuration through machine restarts, and applies across a fleet of servers. Such orchestration allows server configuration without reliance on external applications. For example, the above described cloud-based initialization CBI uses agent based initialization that ran installation scripts without orchestration, but with orchestration, post-deployment server configuration may include specific sequenced script execution and testing.

In the illustrated implementation, a server is instantiated 102 on, for example, an AWS public cloud environment. Once the server is instantiated, to configure the server, instead of the uncontrolled CBI execution discussed above, exemplary implementations "orchestrate" core configuration 104 such as by executing script/other file(s) to initially configure an instantiated server, e.g., executing a configuration script, log results, and for example, reboot servers to apply changes, and repeating scripts and/or running more scripts in a desired sequence to further extend features/set configuration of a cloud-based initialization. Exemplary implementation may be written in a variety of languages/interpretative environments, such as Windows PowerShell (e.g. the Windows take on Linux Bash). Windows PowerShell is provided as a well-known example scripting environment, but it will be appreciated many other scripting environments may be used instead, e.g., the reference to one of the many Linux/Unix scripting options. The term orchestration includes dependency/successful previous script execution and/or in parallel execution where available and desirable.

It will be appreciated after instantiating 102 a server, and orchestrating core configuration 104, e.g., by a coordinated and/or sequenced execution of scripts and/or other files, a server may be further configured with an orchestrated tenant configuration 106, which may operate similarly to the core configuration, e.g., by a coordinated and/or sequenced execution of scripts and/or other files to further configure the server as desired by, for example a tenant for which the server is being deployed. It will be appreciated that each step along configuration 104, 106, may be tested so that a server configuration may be confirmed to have a desired core and tenant configuration before the server is deemed complete for launch 108.

By applying the principles herein, when instantiating/deploying a server, such as in an immutable environment, configuration and/or validation operations may repeat, e.g., repeat executing a script until successful, hence a 'second' script execution may simply be repeating the first until it completes successfully. This may be necessary when, for example, a script is waiting for a certain resource to exist/become available, which may be a connectivity issue of requiring networking to be active, or for a database to finish initializing, etc. Thus, a script may test for a condition and if it fails, it may log a result that, as will be discussed in more detail below, result in the script repeating until successful. This may therefore guarantee successful stepwise completion of server configuration. Note that a fundamental error, such as a needed resource unavailability causing an infinite retry loop may be identified through monitoring of activity logs, e.g., in various exemplary implementations, the Splunk platform (see, e.g., Internet URL dev.splunk.com/enterprise/docs/developapps/addsupport/logging) may be used to monitor server configuration progress externally to the server.

In various implementations, script execution order may be determined by naming convention or other technique to indicate desired execution sequence. If for example a naming convention is used, then one may employ a directory of scripts (e.g., similarly to the execution of scripts in a directory as performed by Cloudbased-Init (CBI), but where execution of scripts (or other files/data) is performed in name/alphabetical/numerical/etc. order. It will be appreciated in a multi-tenant environment, core configuration 104 may employ a naming convention for associated scripts/files/data/etc. coming "before" (e.g., alphabetically, numerically, etc.) the naming convention for scripts/files/data/etc. a tenant may have their own specific tenant configuration 106. In such fashion, orchestration of all configuration from instantiation through server launch 102-108 may be managed. It will be appreciated other techniques may be used to control orchestration, such as storing sequencing, or dependency relationships between scripts/files/data/etc. in a registry, such as the Windows Registry of the instantiated 102 server. It will be appreciated Windows is provided as one well-known server that may be instantiated and the discussion herein applies to other servers and registry type of data storage. In one exemplary implementation, if using CBI, it will be appreciated one or few scripts may be placed in the CBI execution environment such that the one (or a few) scripts may be used to then trigger an orchestrated application of other scripts as described herein. In another exemplary implementation, the CBI may be replaced with a different initialization system that operates as described herein.

Figure 2:
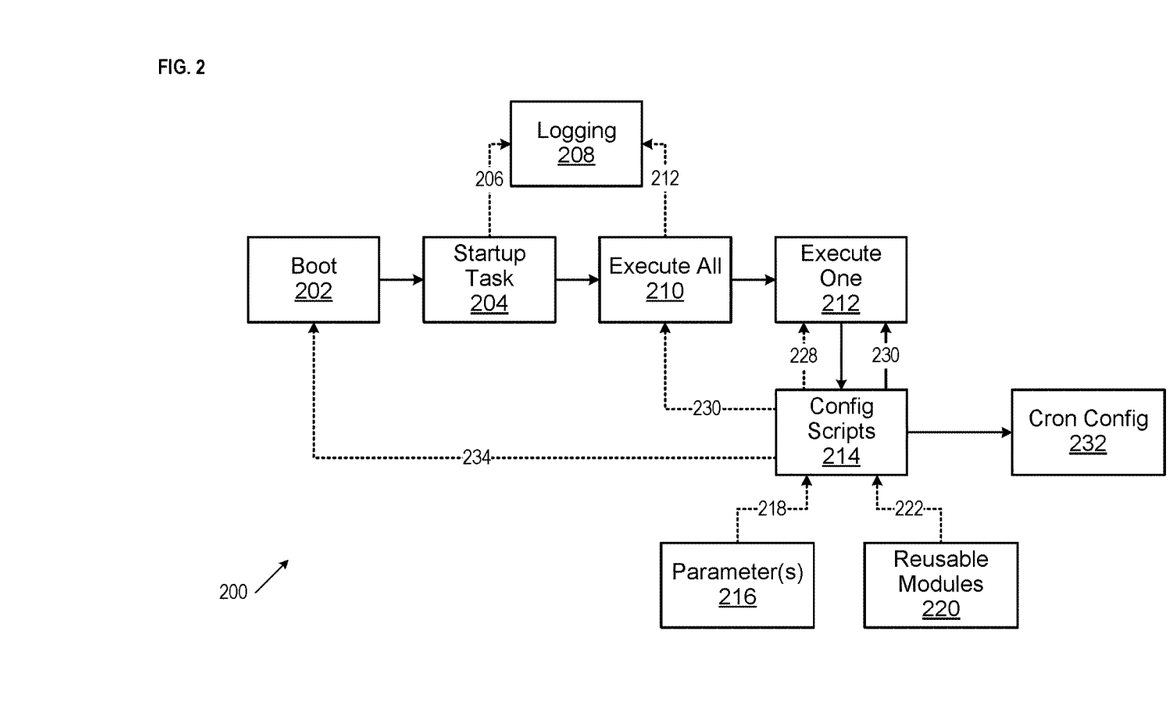
FIG. 2 is a block diagram according to some example implementations.

FIG. 2 is a block diagram 200 according to some example implementations. The illustrated implementation may, for example, be used to perform the FIG. 1 core configuration 104 discussed above. It is assumed herein the reader is familiar with instantiating/deploying servers and/or services in a traditional as well as cloud-based environment, such as AWS or others, including use of configuration and/or management tools to set up and/or maintain server installations. In this exemplary implementation, there may be Post Deploy Configuration (PDC) Framework, e.g., as may be used in an Active Directory Service (ADDS) in Windows Server, in which a team owning a Windows Server (or other operating system) based application workload would inject a Custom Script into a PDC Library.

It will be appreciated by one skilled in the art the library may be a Source Controlled Repository (SCR) and it may be added as a submodule of a main repository used by a team to configure instantiation/deployment of a server/service. The SCR facilitates automatically updating the library updated configurations. It will be appreciated that reference to Windows environments and related Windows scripting are for expository convenience and other server operating systems and scripting environments may be used to employ the concepts disclosed herein. In an exemplary Windows-based implementation, a PDC Library may contain scripts which to at least configure foundational infrastructure services, e.g., to at least perform core configuration 104. It will be appreciated the library may have a crowdsourced nature allowing multiple teams to update the library content and ensure configuration scripts follow strict coding guidelines, e.g., scripts may be defined/validated through a template, and may be peer reviewed and tested. For example, scripts may perform any desired core configuration, such as AD domain join, client and agents configurations, logging, vulnerability fixes, and/or other tasks typically executed by administrators at build and/or by configuration management software.

In various implementations, a framework is used to facilitate configuring servers (or services), such as a Windows server, in a public cloud domain. It will be appreciated unlike a typical local server installation where an administrator has access to a server to manually and/or locally handle configuration, in a cloud environment an administrator may lack such physical access. In fact, server hardware may be virtualized and a manual approach would not scale properly. Various exemplary implementations address instantiating and/or deploying servers and/or services in cloud-based environments where orchestrated script execution may be used to incrementally move a server configuration from an initial instantiated state (e.g. FIG. 1 item 102) to a final launch state (e.g. FIG. 1 item 108), while accommodating configuration interests of both an administrator, as well as a tenant (e.g., a client of the administrator).

It will be appreciated some implementations may make use of a configuration agent associated with the server environment (such as may be used in Cloudbased-Init (CBI)), while others utilize their own scripts to control and/or direct server configuration. The term "scripts" is intended in the general sense of a document, data, registry or database entry, or other indicia of operations to be performed and a sequence or sequences and/or interdependency that may be associated with the scripts to direct performance of configuration operations. In a Windows server installation and configuration, the scripts relied on herein may be copied into known storage locations (directories) accessible during configuration and used to orchestrate configuration. In various implementations, as discussed above installation tools such as CBI may be extended to provide orchestrated (e.g. controlled, ordered, sequenced, interdependent, etc.) script execution, as well as specific script repetition to ensure each step forward in configuration has reached a desired state and/or status before continuing on to the next configuration operation. Each step of configuration may be logged to facilitate orchestration step success. In some exemplary implementations, scripts may be written in PowerShell when, for example, instantiating and configuring a Windows platform. It will be appreciated PowerShell does not need an agent in order to be used, and may be based on the .NET (dotnet) programming environment that is available in a modern Windows Operating System. After server instantiation, a PDC Library may be customized to provide configuration as by a team.

Thus, for example, a server may be booted 202. After booting, a startup task 204 may run to start post-instantiation configuration. In some implementations, a cloud specific agent, e.g., an agent task and/or processes may operate in accord with a particular cloud-based deployment being performed, start and perform cloud-specific configurations. In some exemplary implementations, the agent may be replaced with or tasked to call (e.g. execute, run, transfer control to, etc.) an "execute all" script/task/etc. The startup task is intended to be agnostic of any specific cloud environment. In the illustrated implementation, the startup may be logged 206 to a logging 208 service, such as Splunk discussed above. It will be appreciated any logging service may be used, with an expectation that logging may be accessed remotely to the operation of configuring the server to facilitate checking on the progress of server/service configuration. As illustrated a next operation may be to run an "execute all" 210 script, which may be triggered by the startup task. The execute all script may be a PowerShell script (see item QQQ discussion below), and its operations may be logged 212 to the logging 208 service. Logging may facilitate contemporaneously monitoring configuration progress. Note that in the exemplary implementations, assuming use of scripts, it will be appreciated output from scripts may be piped, directed, saved and/or otherwise made available to other programs, processes, files, interfaces, etc. whether directly and/or indirectly through the logging service.

In accord with desired orchestration, the execute all 210 script may in turn locate and run each script, e.g., the execute one 212 script represents a current script to be performed, in accord with the orchestration. The execute all script is assumed to have access to a designated folder for configuration scripts 214, e.g., the PDC Library contains scripts discussed above. As with the term "scripts" being intended in a very general sense of an indicator of actions to be performed in a desired sequence, the term "folder" is intended to be a general reference to data storage, such as a repository for the scripts. It will be appreciated the folder may be an actual folder in a file system on an instantiated server, reference to a virtual (e.g., online, remotely mounted, remotely accessible, etc.) folder, a pointer to a data object appearing to an operating system to be a folder, or other simulated folder. For example, if a server is instantiated in a virtual hardware environment, the folder may be a virtual machine construct showing existence of a folder in the server that is actually located someplace else, such as in memory and/or storage associated with the server and presented as being part of the server.

In various exemplary implementations, scripts in the folder 214 may be removed, replaced, and/or added as long as they are properly identified for orchestration, e.g., named, numbered, or otherwise sequenced in accord with a desired system for identifying execution order for the scripts. To facilitate code reuse, and to reduce parameterization errors, there may be a parameters 216 resource (e.g., a folder, file, database, etc.) accessible to a script to provide 218 parameters to be used by a script, e.g., to configure a script for a current orchestrated operation. In one embodiment, the parameters resource is a JavaScript Object Notation (JSON) parameters file where teams may replace and/or update this resource as desired in accord with need for a to utilize specific parameters, enable scripts not executed by default, or to take other action. There may also be a reusable modules 220 resource, that may provide 222 reusable code, data, or other information that may be common to and/or shared with different configuration scripts. It will be appreciated scripts may be differentiated by parameters and/or modules provided 218, 222 to a particular script execution, e.g., the same script may execute twice but be provided different parameters and/or module definitions and operated differently in accord with the orchestration of the configuration.

In one exemplary implementation, scripts may be idempotent to ensure an applied customization at any specific orchestration point always meets a desired configuration and/or state at every boot/reboot. For example, scripts may be retried indefinitely in case they fail, such as may occur if a needed resources is not yet available. In such a manner, processing may loop back 230 to repeat calling the current execute one 212 script, which may be configured again in accord with provided 218, 220 parameters 216 and reusable modules 220, or it may be determined for efficiency the script does not need to be configured again. In either case, the script may be repeated until successful and configuration may proceed to the next operation. In exemplary implementations, the reusable modules 220 may be implemented with PowerShell modules, which provide a collection of support functions allowing the above-described code reuse (including environmental variables setting) and utilization of a JSON file implementation of the parameters 216 for parameterization and feature flags. It will be appreciated while scripts are discussed as being performed in a single threaded sequence, this is not required, and scripts or their equivalent may be performed in parallel to the extent that one script (or its equivalent) does not depend on the output of another.

In some implementations, there may be a cron-based folder 232 storing configuration scripts, data, files, etc. that may be scheduled with cron to perform tasks/scripts/etc. to support, for example, the FIG. 1 item 104 core configuration. It will be understood cron is simply a well-known exemplary task scheduler used in, for example, Linux/Unix type of environments, and that cron or an equivalent scheduler may be used during server configuration. In some implementations, multiple teams may use the cron-based folder 232 to place scripts to be executed via scheduled tasks. It will be appreciated these 216, 220, 232 are exemplary folders and other configurations and embodiments are contemplated based on the type of server environment(s) actually employed to implement the concepts and principles discussed herein. The configuration scripts 214 folder may include a script to create a scheduled task 124 for selected scripts available in, for example, a related sub folder. Such scripts may be, for example, configured according to an accompanying XML declarative file and executed through a helper script such as the execute one 212. It will be appreciated after completing a particular configuration operation by way of the current script being performed by the execute one script, related cron jobs/tasks may be scheduled to perform follow-up operations that may now be performed once the underlying execute one script has successfully completed. It will be appreciated some script operations require a server/service being configured to be rebooted 234. In the illustrated exemplary implementations, as with looping 230 back to repeat a script execution, the booting 202 starts the process over, but with logged 208 state, configuration may proceed where it left off.

Figure 3:
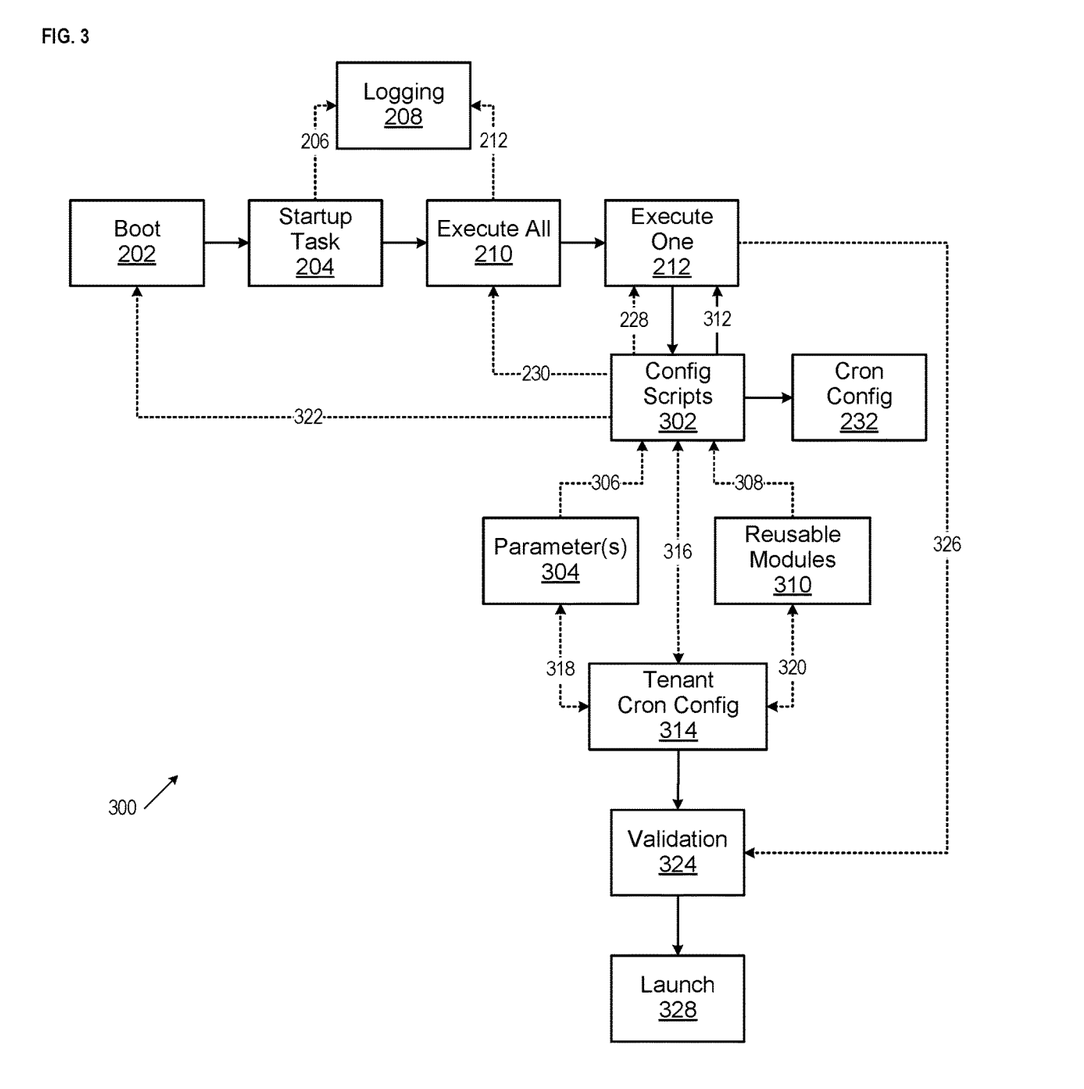
FIG. 3 is a block diagram according to some example implementations.

FIG. 3 is a block diagram 300 according to some example implementations. This illustrated implementation may, for example, be used to perform the FIG. 1 tenant configuration 106 discussed above, and may be considered to operate analogously to FIG. 2 items 202-234 but where configuration scripts 302 address tenant needs/goals to be addressed after successful FIG. 2 core configuration.

In one exemplary implementation, a team, such as a tenant, stores their scripts in the configuration scripts 302 folder. It will be appreciated orchestration may accommodate leaving the core configuration scripts in the folder, where tenant scripts may be named or otherwise identified as having operational/performance sequences to occur after completing the core configuration. For example, assuming a sequential number file-name based orchestration of execution order, the additional tenant scripts may be given a higher number and thus they would be executed after the default scripts, such as to performed at the end of core configuration. This may ensure core features and/or services are started/configured/enabled/etc. and to enable, for example, a load balancer or other server management process to evaluate the server and to pass a relevant health check to bring the server/a server instance into service before tenant scripts may attempt to use and/or further configure the server.

As with FIG. 2, configuration scripts 302 may be stored in a directory, a currently executing script may be provided 304 parameters 306 and provided 308 reusable modules 310 to customize operation of the current script as needed by the tenant. Each tenant script, as discussed above with respect to core configuration (see, e.g., FIG. 2 item 230), may loop 312 until the script successfully completes. In this illustrated implementation, a tenant cron configuration 314 may be accessed 316 to schedule cron jobs/tasks as discussed above to schedule performing operations/tasks after script and/or configuration operation completion. In the illustrated embodiment, the tenant cron configuration may be provided 318 parameters 304 and/or provided 320 reusable modules 310 for performing scheduling the desired tenant cron configuration tasks. It will be appreciated, although not illustrated in FIG. 2, an analogous providing 318, 320 may be performed with respect to the FIG. 2 cron configuration 232. It will be further appreciated, in some exemplary implementations, the cron configuration 232 and tenant cron configuration 314 are the same folder and may simply use a naming or other sequencing identification to distinguish and properly orchestrate operation of cron jobs. As with FIG. 2, certain scripts may require a server to reboot 322 so configuration may restart and continue with configuring a server.

It will be appreciated this FIG. 3 discussion is an abbreviated version of the FIG. 2 discussion above. Similar principles, techniques and variations discussed above apply here as well. When all tenant scripts in the configuration scripts 302 folder have successfully completed, at this point, a server has been instantiated, its core configuration successfully completed, its tenant configuration is successfully complete, and desired cron configurations have been applied. The configured server may then undergo validation 324. It will be appreciated after core configuration there may be no tenant scripts/customization to perform, and if so, processing may skip 326 from the end of the FIG. 2 discussion, to server validation. It will be appreciated validation may include the cloud-based server environment testing the server for appearing to be installed and functioning correctly. Validation may also include confirming all desired core configuration services and/or server features are present and available, e.g., one may ping ports, access data conduits/data pathways, test for active processes, confirm undesired services are not running, etc. Similarly, tests may be performed to ensure tenant customizations are present and working correctly. If validation tests out correctly, then the server may be launched 326 and thus complete the FIG. 1 operations 102-108.

Figure 4:
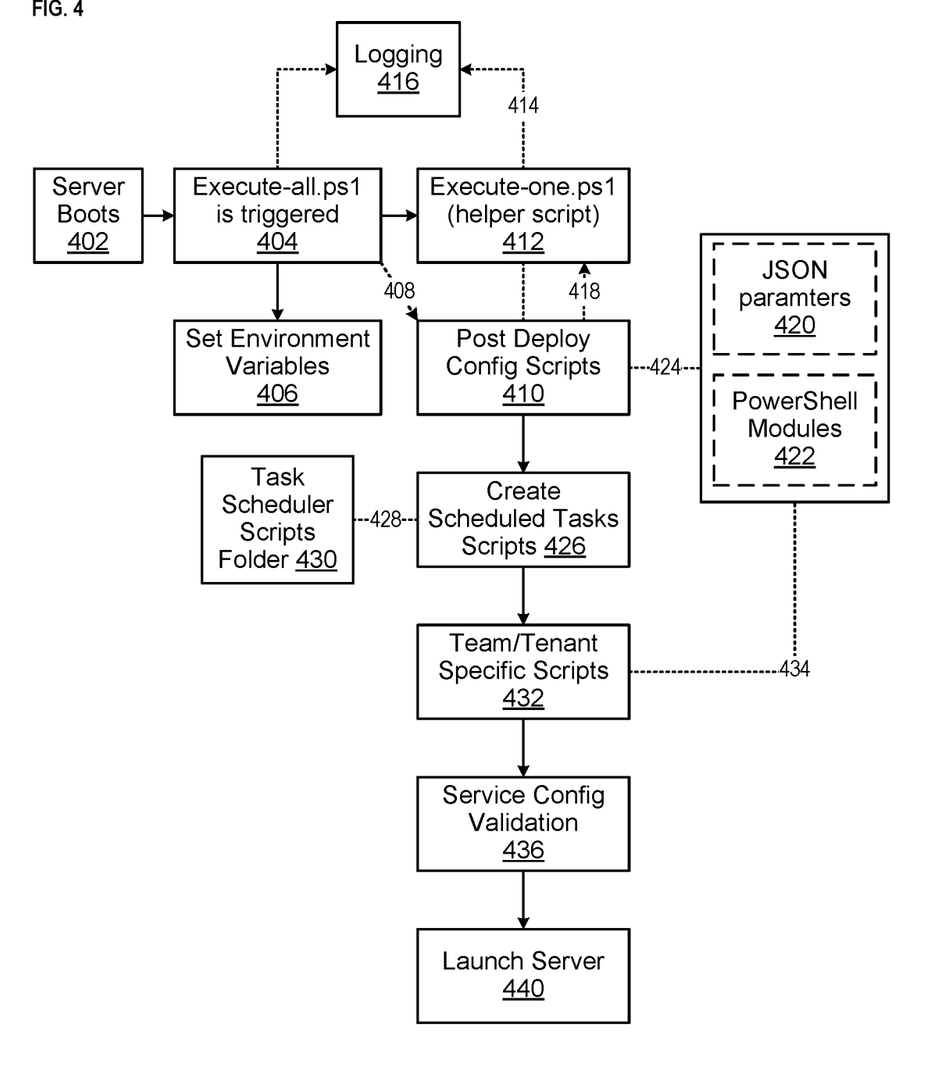
FIG. 4 is a flow diagram in accordance with some example implementations.

FIG. 4 is a flow diagram 400 in accordance with some example implementations based on the FIGS. 2-3 exemplary implementations. As illustrated, a server/server instance (re)boots 402, which as discussed above may occur at initial server instantiation as well as in response to various script exit codes. After (re)boot, a main script execute-all.ps1 is triggered 404 such as by way of an AtStartup Scheduled Task (or by way of an agent specific to the cloud environment hosting the server. The main script may preliminary customization/configuration of the server to prepare for core configuration and tenant configuration.

The main script execute-all.ps1 may then set 406 Environment-specific (AWS, Azure, etc) specific variable, which one skilled in the art will appreciate may be fetched from the deploying server's Instance Metadata. The main script execute-all.ps1 looks for 408 any PowerShell scripts in a given folder, e.g., a core post deploy configuration scripts 410 folder, sorts them alphabetically and starts executing them using a execute.one.ps1 helper script 412 which is also responsible of logging 414 any output coming from the script to a file, or, if available in the environment, log files can be forwarded to a log-ingestion service 416, such as to provide access to the logs without accessing the server/server instance. Processing 404, 412 of all core post deployment configuration scripts loops 418 until all scripts are successfully completed. Analogous to FIGS. 2-3, in the illustrated implementation, a JSON parameters file 420 and PowerShell Modules 422 may be used to configure 424 a currently executing script. As will be appreciated by one skilled in the art, PowerShell Modules represent reusable code that may be incorporated into scripts and parameterized with data from the JSON parameters file.

Each script is developed to be idempotent to ensure applied customizations and/or configuration always meets a desired state at every reboot and in some implementations, are retried indefinitely until success (e.g., until and exit code=0). It will be appreciated infinite loops may be identified, and stopped or addressed (e.g., identifying and fixing a problem) through monitoring the logging 416. In this embodiment, the customization codebase relies on the PowerShell modules 422, a collection of support functions that, among other things, provides for code reuse (including Environmental Variables setting). All scripts may rely on parameters and feature flags available in a corresponding declarative JSON parameters file 420. Use of the parameters and modules ensures scripts are generalized and do not contain hard coded values, and that they may be enabled/disabled/personalized.

Once all the core scripts are executed as discussed above, there will be another script (or scripts) to creating scheduled tasks 426. This script will, in this illustrated embodiment, create 428 as many scheduled tasks as the number of scripts available in a given sub-folder of a task scheduler scripts folder 430. These scripts may be configured to run periodically based on a configuration provided by an accompanying XML declarative file and executed, for example, by the same helper script execute-one.ps1 412.

In the illustrated embodiment, after schedule tasks are created (e.g., by way of cron or other scheduling), team/tenant specific scripts 432 may be executed. As with other scripts, team/tenant scripts may be provided 434 parameters and PowerShell Modules to customize them. In one embodiment, a service team leaves the core (e.g., basic) scripts untouched, and adds more with a higher number/identified to be orchestrated (coordinated execution) at the end of the core configuration. The team/tenant specific scripts may, for example, provide for service-specific configurations/validation 436 scripts desired by a team/tenant. In the illustrated implementation, validation ensures all desired service/features are properly started, configured, enabled, etc. at the end of configuration to facilitate, for example, a load balancer to pass relevant health checks and launch 440 the server/server instance and bring it into service. In the illustrated exemplary implementation, the agent (or main scheduled task script) stops/finishes and may be triggered again at next reboot (to enable updating a server, reconfiguring it, etc.).

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
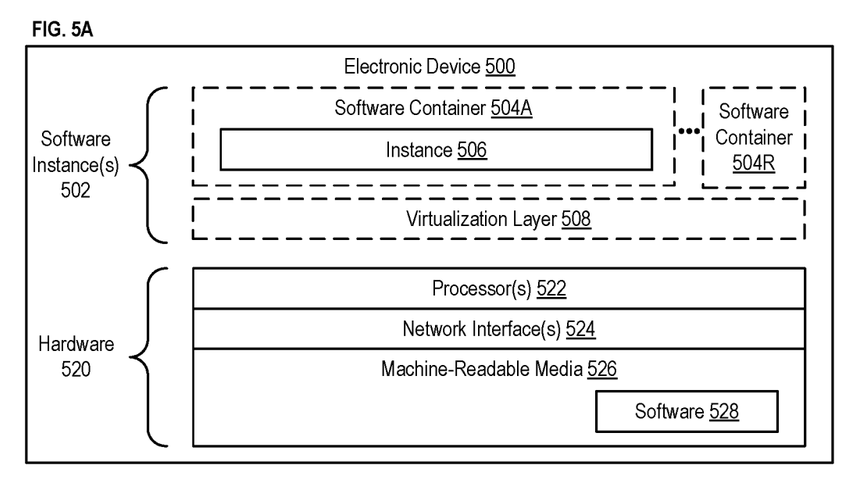
FIG. 5A is a block diagram illustrating an electronic device according to some example implementations.

FIG. 5A is a block diagram illustrating an electronic device 500 according to some example implementations. FIG. 2A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the orchestrated post-deployment configuration service may be implemented in one or more electronic devices 500. In one implementation: 1) each of the clients is implemented in a separate one of the electronic devices 500 (e.g., in end user devices where the software 528 represents the software to implement clients to interface directly and/or indirectly with the orchestrated post-deployment configuration service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the orchestrated post-deployment configuration service is implemented in a separate set of one or more of the electronic devices 500 (e.g., a set of one or more server devices where the software 528 represents the software to implement the orchestrated post-deployment configuration service); and 3) in operation, the electronic devices implementing the clients and the orchestrated post-deployment configuration service would be communicatively coupled (e.g., by a network) and would establish between them (or through one or more other layers and/or or other services) connections for submitting scripts and/or other configuration data to the orchestrated post-deployment configuration service and returning configuration status, script results and/or other data as desired to the clients. Other configurations of electronic devices may be used in other implementations (e.g., an implementation in which the client and the orchestrated post-deployment configuration service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
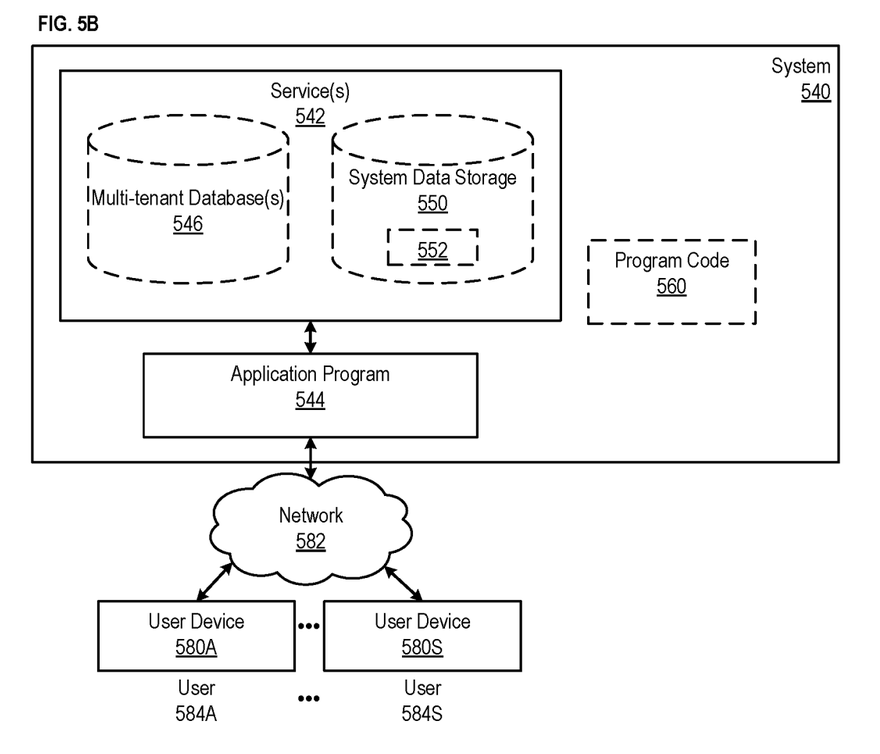
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the orchestrated post-deployment configuration service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 280A-380S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: orchestrated post-deployment configuration service 542; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 280A-380S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 242 are implemented using virtual applications dynamically created at run time responsive to queries from the user devices 280A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 260 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 244 includes an application setup mechanism that supports application developers' creation and management of applications, which may be saved as metadata by save routines. Invocations to such applications, including the orchestrated post-deployment configuration service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 282 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 240 and the user devices 580A-580S.

Each user device 280A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 280A-380S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computing device operable to provide a multi-tenant system associated with a tenant and at least one repository for storing configuration scripts to at least configure a server after an instantiation of the server in a cloud, comprising:

one or more processors; and
a non-transitory machine-readable storage medium that provides instructions that, if executed by the one or more processors, are configurable to cause the computing device to perform:
storing in the at least one repository, configuration scripts including first scripts associated with the multi-tenant system and second scripts associated with the tenant;
booting the server after the instantiation;
first orchestrating script execution of the first scripts, the orchestrating including determining an order of executing selected ones of scripts being orchestrated;
second orchestrating execution of the second scripts based on at least one selected from a group consisting of: parameter data provided by a parameter resource, and reusable modules provided by a reusable modules resource;
identifying a first script of the configuration scripts to be executed;
executing the first script to first configure the server, the executing having a first result;
logging a first result corresponding executing the first script;
rebooting the server after executing the first script;
identifying, based at least in part on the first result, a second script of the configuration scripts to be executed after the first script;
executing the second script to second configure the server;
logging a second result corresponding to executing the second script; and
identifying, based at least in part the second result, a third script to be executed in the order of the scripts.

2. The computing device of claim 1, wherein the medium further provides instructions configurable to cause the computing device to perform:
inspecting the first result;
determining the first result corresponds to a failure of executing the first script; and
identifying the second script to be the first script to repeat execution of the first script.

3. The computing device of claim 1, wherein results are disposed in a selected one or more of: the repository, a server-storage associated with the server, or a tenant-storage associated with the tenant.

4. The computing device of claim 1, in which the orchestrating execution of scripts is based at least in part on one or more dependency relationship between selected scripts in the repository, and wherein each of the execute first scripts is to have an associated successful execution before executing the second scripts.

5. The computing device of claim 4, wherein the dependency relationship is based at least in part on identifiers associated with scripts to be executed.

6. The computing device of claim 1, wherein the instructions include further instructions configurable to cause the computing device to perform:
first configuring the server based at least in part on performing the first orchestrating script execution of the first scripts; and
second configuring the server based at least in part on performing the second orchestrating script execution of the second scripts.

7. The computing device of claim 1, wherein the cloud is a selected one or more of: a public cloud, or a private cloud.

8. The method device of claim 1, further comprising:
first configuring the server based at least in part on performing the first orchestrating script execution of the first scripts; and
second configuring the server based at least in part on performing the second orchestrating script execution of the second scripts.

9. A method for providing a multi-tenant system associated with a tenant and at least one repository for storing configuration scripts to configure a server after an instantiation of the server in a cloud, the scripts including first scripts associated with the multi-tenant system and second scripts associated with the tenant, the method comprising:
first orchestrating script execution of the first scripts, in which orchestrating including determining an order of executing selected ones of scripts being orchestrated;
second orchestrating execution of the second scripts based on at least one selected from a group consisting of: parameter data provided by a parameter resource, and reusable modules provided by a reusable modules resource;
identifying a first script of the configuration scripts to be executed;
executing the first script to first configure the server, the executing having a first result;
logging a first result corresponding executing the first script;
rebooting the server after executing the first script;
identifying, based at least in part on the first result, a second script of the configuration scripts to be executed after the first script; and
executing the second script to second configure the server.

10. The method of claim 9, further comprising:
determining the first result corresponds to a failure of executing the first script; and
identifying, based at least in part on the failure, the first script as the second script to repeat execution of the first script.

11. The method of claim 9, wherein results are disposed in a selected one or more of: the repository, a server-storage associated with the server, or a tenant-storage associated with the tenant.

12. The method of claim 9, in which performing orchestrating execution of scripts is based at least in part on one or more dependency relationship between selected scripts in the repository, the method further comprising:
determining a first dependency for a subsequent script of a previous script to include a successful execution of the previous script prior to executing the subsequent script; and
executing the previous script until the successful execution of the previous script.

13. The computing device of claim 9, wherein performing orchestrating execution of scripts is based at least in part on one or more dependency relationship based at least in part on identifiers associated with scripts to be executed.

14. The method of claim 9, wherein the cloud is a selected one or more of: a public cloud, or a private cloud.

15. A non-transitory machine-readable storage medium that includes instructions for providing a multi-tenant system associated with a tenant and at least one repository for storing configuration scripts to configure a server after an instantiation of the server in a cloud, the scripts including first scripts associated with the multi-tenant system and second scripts associated with the tenant, the instructions, if executed by the one or more processors, are configurable to cause the computing device to perform:

first orchestrating script execution of the first scripts, in which orchestrating including determining an order of executing selected ones of scripts being orchestrated;
second orchestrating execution of the second scripts based on at least one selected from a group consisting of: parameter data provided by a parameter resource, and reusable modules provided by a reusable modules resource;
identifying a first script of the configuration scripts to be executed;
executing the first script to first configure the server, the executing having a first result;
logging a first result corresponding executing the first script;
rebooting the server after executing the first script;
identifying, based at least in part on the first result, a second script of the configuration scripts to be executed after the first script; and
executing the second script to second configure the server.

16. The storage medium of claim 15, the instructions further including instructions configurable to cause the computing device to perform:
determining the first result corresponds to a failure of executing the first script; and
identifying, based at least in part on the failure, the first script as the second script to repeat execution of the first script.

17. The storage medium of claim 15, in which performing orchestrating execution of scripts is based at least in part on one or more dependency relationship between selected scripts in the repository, the instructions further including instructions configurable to cause the computing device to perform:
determining a first dependency for a subsequent script of a previous script to include a successful execution of the previous script prior to executing the subsequent script; and
executing the previous script until the successful execution of the previous script.

18. The storage medium of claim 15, the instructions further including instructions configurable to cause the computing device to perform:
determining at least one dependency relationship based at least in part on identifiers associated with scripts to be executed; and
orchestrating execution of scripts based at least in part on the at least one dependency.

19. The storage medium of claim 15, the instructions further including instructions configurable to cause the computing device to perform:
first configuring the server based at least in part on performing the first orchestrating script execution of the first scripts; and
second configuring the server based at least in part on performing the second orchestrating script execution of the second scripts.

20. The storage medium of claim 15, the instructions further including instructions configurable to cause the computing device to perform: instantiating the server in a selected one or more of: a public cloud, or a private cloud.

* * * * *